(12) United States Patent
Watanabe et al.

(10) Patent No.: US 7,478,938 B2
(45) Date of Patent: Jan. 20, 2009

(54) TWO-SIDED-EMISSION-TYPE BACK LIGHT UNIT AND DISPLAY USING SAID BACK LIGHT UNIT

(75) Inventors: Kiyokazu Watanabe, Fujikawaguchiko-machi (JP); Daisaku Okuwaki, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 257 days.

(21) Appl. No.: 11/371,158

(22) Filed: Mar. 9, 2006

(65) Prior Publication Data

US 2006/0203516 A1 Sep. 14, 2006

(30) Foreign Application Priority Data

Mar. 10, 2005 (JP) .............................. P2005-068184

(51) Int. Cl.
*F21V 7/04* (2006.01)
(52) U.S. Cl. .................. 362/607; 362/623; 362/624
(58) Field of Classification Search ......... 362/600–634, 362/561; 349/65
See application file for complete search history.

(56) References Cited

U.S. PATENT DOCUMENTS 6,561,663 B2 * 5/2003 Adachi et al. ............... 362/616

FOREIGN PATENT DOCUMENTS

JP 2004-144990 5/2004

* cited by examiner

*Primary Examiner*—Bao Q Truong
(74) *Attorney, Agent, or Firm*—Browdy and Neimark, P.L.L.C.

(57) ABSTRACT

A back light unit including a light source, a light guiding plate having an entrance surface to receive light emitted from the light source, a first emission surface and a second emission surface, a semi-transmissive/reflective member disposed to face one of the first emission surface and the second emission surface, and a chromatic correcting member, the semi-transmissive/reflective member having an incident surface to receive light emitted from one of the first emission surface and the second emission surface and an exit surface, the chromatic correcting member being configured to correct chromaticity of light emitted from the exit surface of the semi-transmissive/reflective member and emit corrected light.

9 Claims, 8 Drawing Sheets

TWO-SIDED-EMISSION-TYPE BACK LIGHT UNIT AND DISPLAY USING SAID BACK LIGHT UNIT

CROSS-REFERENCE TO THE RELATED APPLICATION

This application is based on and claims priority from Japanese Patent Application No. 2005-068184, filed on Mar. 10, 2005, the disclosure of which is incorporated herein by reference in its entirety.

BACKGROUND OF THE INVENTION

1. Field of the Invention

The present invention relates to a two-sided-emission-type back light unit to be used in, for example, a liquid crystal display in a mobile phone, Personal Digital Assistant (PDA) or the like and a display using the back light unit.

2. Description of Related Art

FIG. 7 illustrates one example of a conventional back light unit to illuminate a small-scale display. In FIG. 7, light rays 62 and 64 emitted from a light source 14 comprising, for example, a light emitting diode (LED) are guided to a light guiding plate 12. The light rays 62 and 64 are transmitted in the light guiding plate 12 by repeated reflection therein. In this case, the light ray 62 reflected or refracted by grooves or textured undulations provided on a lower surface of the light guiding plate 12 is emitted from an exit surface which is an upper surface of the light guiding plate 12.

The light emitted from the upper surface of the light guiding plate 12 is diffused by a diffusion sheet 38 to provide uniform distribution, thereafter, the diffused light is focused by prismatic sheets 40 and 42 in a direction perpendicular to the light guiding plate 12, and the focused light is directed to a display, for example, a liquid crystal display (LCD) 44 and illuminates the LCD 44.

Meanwhile, a part of the light ray 64 is emitted from the lower surface of the light guiding plate 12. The emitted light is reflected by a reflective sheet 60 which is disposed to face the lower surface of the light guiding plate and returned to the light guiding plate 12.

Thereafter, the returned light is emitted from the exit surface which is the upper surface of the light guiding plate 12 to illuminate the LCD 44, similarly to the light ray 62.

The LCD 44 has conventionally, been illuminated by a back light unit of the kind shown in FIG. 7. In recent years, in some instruments such as mobile phones, PDAs or the like, LCDs have come to be provided on two sides of each instrument, for example, on front-back both sides of an openable and closable cover portion of a mobile phone.

Heretofore, two back light units have been provided for the two LCDs. However, one back light unit may be used for the two LCDs to accomplish a miniaturized and inexpensive instrument. That is to say, the back light unit is composed of a two-sided-emission-type back light unit having an upper emission surface and a lower emission surface. The two-sided-emission-type back light unit is capable of illuminating two LCDs disposed close to the upper emission surface and the lower emission surface, respectively.

For example, if a semi-transmissive/reflective sheet is substituted for the reflective sheet 60 as shown in FIG. 7, it is possible to achieve a two-sided-emission-type back light unit emitting light simultaneously from front-back both sides, using only one light source and one light guiding plate.

One proposed example of this kind of two-sided-emission-type back light unit comprises a back light unit including a light guiding plate and a semi-transmissive/reflective member disposed to face one surface of the light guiding plate and configured to illuminate liquid crystal display panels disposed in both sides of the back light unit by reflecting one portion of light entering the semi-transmissive/reflective member and transmitting the remaining light (see, for reference, Japanese Patent Laid-Open No. 2004-144990, 0017-0022, FIG. 1).

In addition, in Japanese Patent Laid-Open No. 2004-144990, FIG. 4, a semi-transmissive/reflective member is disposed to face a light guiding plate, as shown in FIGS. 8A and 8B of the present application.

The semi-transmissive/reflective member has a structure comprising a reflective layer 24 made of polyolefin or the like, and a white layer 26 made of polyethylene-terephthalate or the like which is attached to the reflective layer 24 by way of an adhesive layer 25 (FIG. 8A), or a structure comprising a white member 28 made of polyethylene-terephthalate or the like (FIG. 8B).

However, with the conventional semi-transmissive/reflective member, there has been the problem that the efficiency of light utilization in the back light unit is significantly reduced because a portion of the light passing the semi-transmissive/reflective member strikes an area which is not the back surface of the liquid crystal panel to be illuminated and is not utilized.

In addition, light passing the semi-transmissive/reflective member is colored, giving rise to the problem of a difference in chromaticity between front illumination light to illuminate a front display and back illumination light to illuminate a back display.

Due to a sheet material used in a generally available semi-transmissive/reflective sheet, the chromaticity of light passing the sheet material is often shifted in a yellow direction, resulting in the problem of different colors on screens of the front LCD and the back LCD.

One important problem in a two-sided-emission-type back light unit is how to adjust the balance of brightness between the front illumination light and the back illumination light. No method for adjusting this balance of brightness is disclosed in Japanese Patent Laid-Open No. 2004-144990.

To adjust the brightness balance, it is necessary to correctly set optical reflectance and optical transmittance of a semi-transmissive/reflective member or semi-transmissive/reflective sheet.

In a semi-transmissive/reflective sheet having a reflective layer 24 of the type shown in FIG. 8A, the reflective layer 24 is thinned to allow functioning as a semi-transmissive/reflective layer. However, because the reflective layer 24 is very thin, there has been the problem that it is very difficult to achieve production of a semi-transmissive/reflective layer having a thickness in which the optical transmittance is set correctly, with good repeatability.

Moreover, in the semi-transmissive/reflective sheet as shown in FIG. 8B, although it is possible to set the optical reflectance and the optical transmittance by way of the thickness of the sheet as a whole, the need for mass production of the sheet means that a standard for the sheet is required, with a small number of thickness types, making it difficult to fine set optical transmittance.

SUMMARY OF THE INVENTION

An object of the present invention is to provide a two-sided-emission-type back light unit capable of correcting chromaticity and adjusting brightness of emission light and a display using the two-sided-emission-type back light unit.

To accomplish the above object, a back light unit according to one embodiment of the present invention includes a light source, a light guiding plate having an entrance surface to receive light emitted from the light source, a first emission surface and a second emission surface, a semi-transmissive/reflective member disposed to face one of the first emission surface and the second emission surface and having an incident surface to receive light emitted from one of the first emission surface and the second emission surface and an exit surface, and a chromatic correcting member.

The chromatic correcting member is configured to correct chromaticity of light emitted from the exit surface of the semi-transmissive/reflective member and emit corrected light.

DETAILED DESCRIPTION OF THE PREFERRED EMBODIMENTS

Preferred embodiments of the present invention will be explained in detail below with reference to the accompanying drawings.

Figure 1:
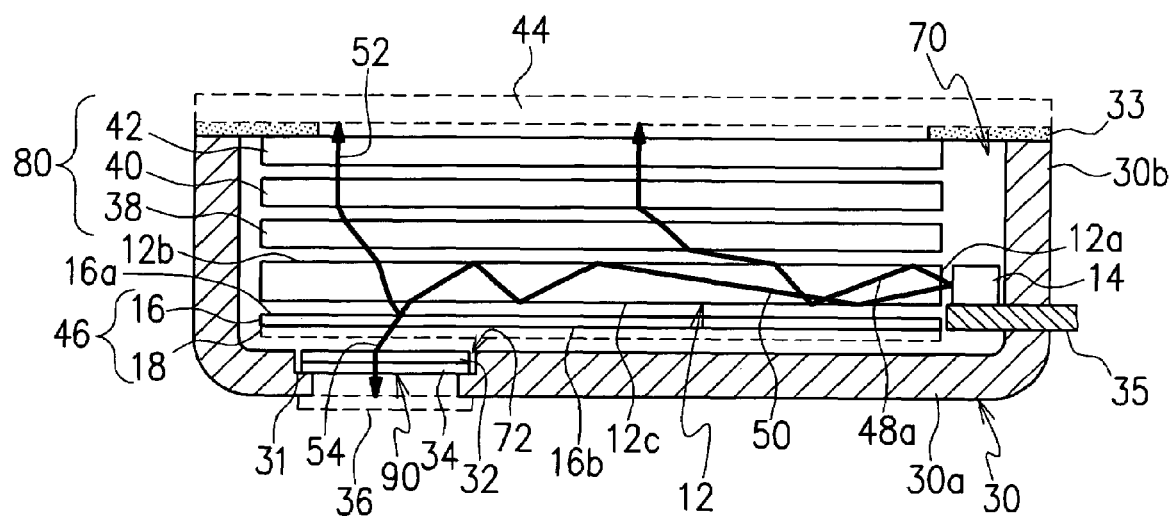
FIG. 1 is a schematic sectional view showing a structure of a two-sided-emission-type back light unit and a display using the two-sided-emission-type back light unit, according to the present invention.

FIG. 1 illustrates a schematic structure of a two-sided-emission-type back light unit, according to one embodiment of the present invention and a small-scale display using the two-sided-emission-type back light unit.

The two-sided-emission-type back light unit according to the present invention can be utilized for any display or panel requiring back light.

Herein, one embodiment using a liquid crystal display as the display is mentioned.

As shown in FIG. 1, the two-sided-emission-type back light unit includes at least one light source 14 comprising, for example, an LED (light emitting diode) having an exit surface and a light guiding plate 12 to receive light emitted from the exit surface of the LED 14.

The light guiding plate 12 includes an entrance surface 12a disposed to face the exit surface of the LED 14 and configured to receive light emitted from the exit surface of the LED as shown by light rays 48a and 50, a first emission surface 12b, and a second emission surface 12c. The light rays 48a and 50 entering the light guiding plate 12 through the entrance surface 12a are transmitted by repeated reflection inside the light guiding plate 12, and emitted from each of the first emission surface 12b and the second emission surface 12c.

In the illustrated embodiment, the first light emission surface 12b is formed on an upper surface of the light guiding plate 12 and the second emission surface 12c is formed on a lower surface of the light guiding plate 12.

A plurality of prisms (not shown) are formed on the second emission surface 12c of the light guiding plate 12. The prisms include inclined surfaces configured to refract or reflect light ray 48a entering the prisms.

More specifically, light ray 48a entering the prisms is reflected in an upward direction on inclined surfaces each having a certain angle and is finally refracted when an incident angle becomes less than a critical angle to be emitted to the outside of the light guiding plate. For example, light refracted on the upper surface (first emission surface 12b) of the light guiding plate 12 is emitted from the upper surface (first emission surface 12b) of the light guiding plate 12.

Light refracted on the lower surface (second emission surface 12c) of the light guiding plate 12 is emitted from the lower surface (second emission surface 12c) of the light guiding plate 12.

In the illustrated embodiment, a first focusing part 80 is disposed to face the first emission surface 12b of the light guiding plate 12. An upper surface of the first focusing part 80 is disposed to face a back surface of a first LCD 44 disposed above the first focusing part 80. The first focusing part 80 includes, for example, a diffusion sheet 38 disposed to face the first emission surface 12b of the light guiding plate 12, first and second prismatic sheets 40 and 42 disposed in turn to face an upper surface or an exit surface of the diffusion sheet 38, as shown in FIG. 1. Here, the first focusing part 80 is not limited to the above-mentioned structure.

Light emitted from the first emission surface 12b of the light guiding plate 12 is diffused by the diffusion sheet 38 to achieve homogenized light distribution, thereafter an optical path of the light is corrected by the prismatic sheets 40 and 42 to a direction perpendicular to the back surface of the first LCD 44 to illuminate the back surface of the first LCD 44 as illumination light 48b.

The prismatic sheets 40 and 42 are configured so that a ridge line 20 of each of the prisms provided on the prismatic sheet 40 is perpendicular to a ridge line 22 of each of the prisms provided on the prismatic sheet 42 in X and Y directions.

It should be noted that a single prismatic sheet may be used instead of the two prismatic sheets 40 and 42. In addition, if two or more prismatic sheets are used, not only may each ridge line of prisms provided on one prismatic sheet be set perpendicular to a ridge line of prisms provided on another prismatic sheet but also an angle of each ridge line may be gradually changed. In this way, an arrangement of the prismatic sheet(s) is not limited to the above-mentioned type.

On the other hand, a semi-transmissive/reflective member 16 is disposed to face the second emission surface 12c of the light guiding plate 12. The semi-transmissive/reflective member 16 includes an incident surface 16a to receive light emitted from the second emission surface 12c and an exit surface 16b to emit light.

Moreover, a chromatic correcting member 18 is disposed to face the exit surface 16b of the semi-transmissive/reflective member 16 (see FIG. 1). The chromatic correcting member 18 is disposed to be in contact with the exit surface 16b of the semi-transmissive/reflective member 16, or at a predetermined interval from the exit surface 16b of the semi-transmissive/reflective member 16.

It should be noted that the chromatic correcting member 18 is disposed on a side where the second emission surface 12c of the light guiding plate 12 is located, but the chromatic correcting member 18 may be disposed on a side where the first emission surface 12b of the light guiding plate 12 is located. Alternatively, a chromatic correcting member may be disposed on each of both sides where the first and second emission surfaces 12b and 12c are located, thereby allowing achievement of chromatic correction of light emitted from both surfaces of the two-sided-emission-type back light unit.

In the illustrated embodiment, the semi-transmissive/reflective member 16 comprises a semi-transmissive/reflective sheet, and the chromatic correcting member 18 comprises a white-type material which is coated on the exit surface 16b of the semi-transmissive/reflective sheet 16. The material for the chromatic correcting member 18 is optionally selected to have a spectroscopic characteristic which will correct light emitted from the exit surface 16b of the semi-transmissive/reflective sheet 16 to the desired chromaticity.

In general, because chromaticity of light passing the semi-transmissive/reflective sheet 16 shifts toward a yellow range, a material having a blue-white type spectroscopic characteristic is selected for the chromatic correcting member 18.

Here, although the chromatic correcting member 18 is attached to the semi-transmissive/reflective member 16 in the way mentioned above, a semi-transmissive/reflective layer 46 may also be structured from the semi-transmissive/reflective sheet 16 and the chromatic correcting member 18 comprising the white-type material (see FIG. 1).

In addition, a general semi-transmissive/reflective member is used here for the semi-transmissive/reflective sheet 16.

In this embodiment, a second focusing part 90 is disposed to face the semi-transmissive/reflective layer 46 made up of by the semi-transmissive/reflective sheet 16 and the chromatic correcting member 18. The second focusing part 90 is disposed to face a back surface of a second LCD 36 to be illuminated by the two-sided-emission-type back light unit.

Here, the second focusing part 90 may have a similar structure to that of the above-mentioned first focusing part 80.

Figure 6A:
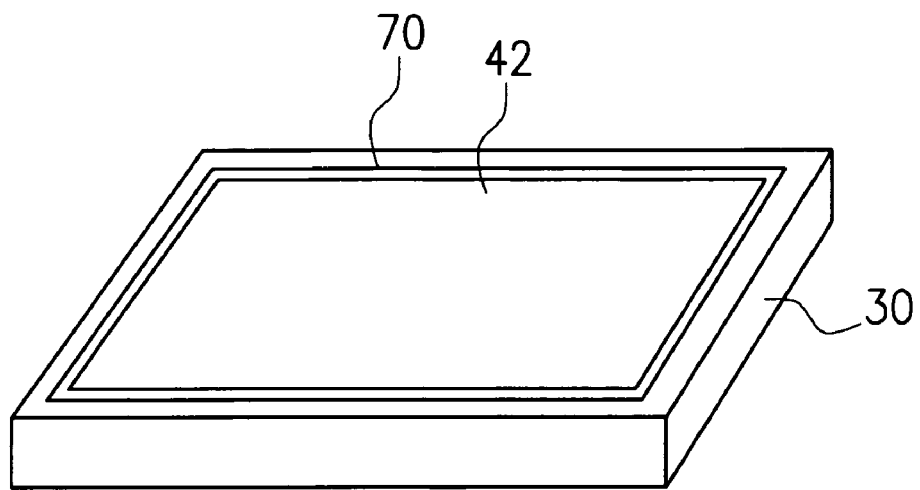
FIG. 6A is a perspective view of a holder used in one embodiment of the two-sided-emission-type back light unit according to the present invention, as viewed from one side of the holder.
Figure 6B:
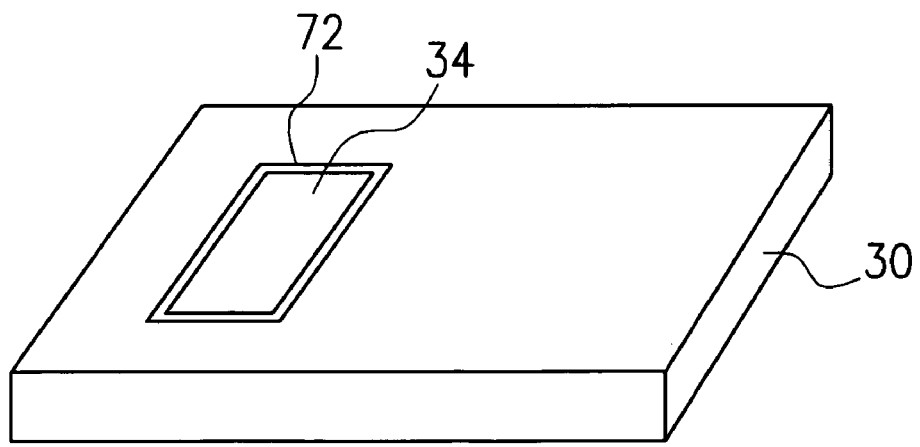
FIG. 6B is a perspective view of the holder used in the one embodiment of the two-sided-emission-type back light unit according to the present invention, as viewed from another side of the holder.
Figure 7:
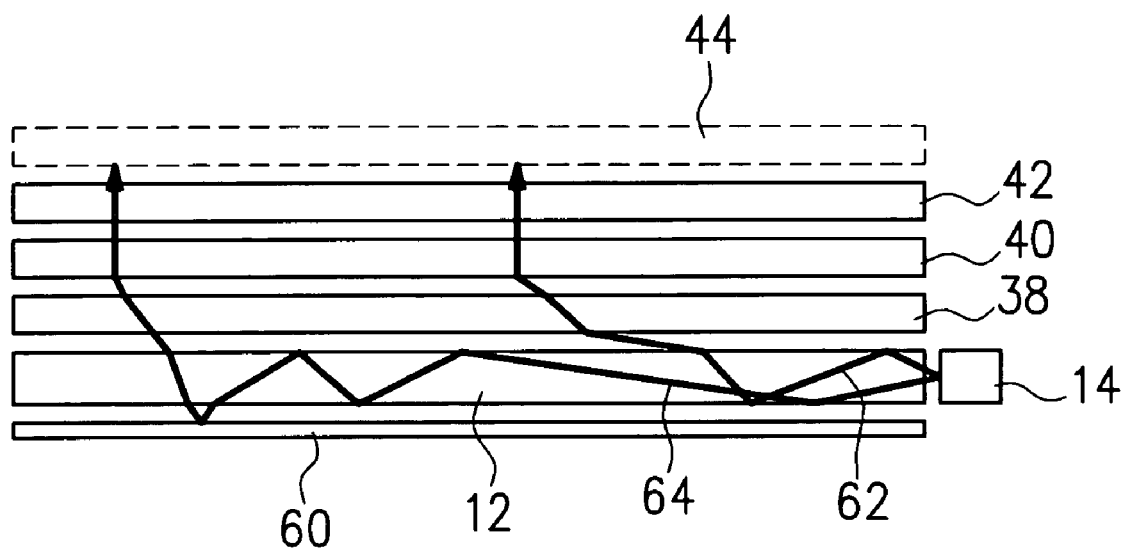
FIG. 7 is a schematic view showing one example of a conventional back light unit for illuminating a small-sized display.
Figure 8A:
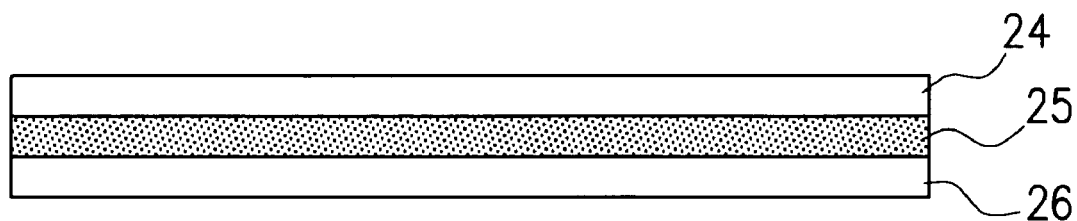
FIG. 8A is a side view showing one example of a conventional semi-transmissive/reflective member.
Figure 8B:
FIG. 8B is a side view showing another example of the conventional semi-transmissive/reflective member.

In the illustrated embodiment, the second focusing part 90 is assembled in a holder 30 containing the two-sided-emission-type back light unit therein. The holder 30 has a bottom wall 30a, and in a portion of the bottom wall 30a facing the back surface of the second LCD 36 a hole 72 having generally the same size as a displaying part of the second LCD 36 is provided. Prismatic sheets 32 and 34 comprising the second focusing part 90 are disposed in the hole 72. As shown in FIG. 6B, the prismatic sheet 34 has an exit surface which is disposed to be exposed through the hole 72 in the bottom surface of the holder 30.

Figure 5A:
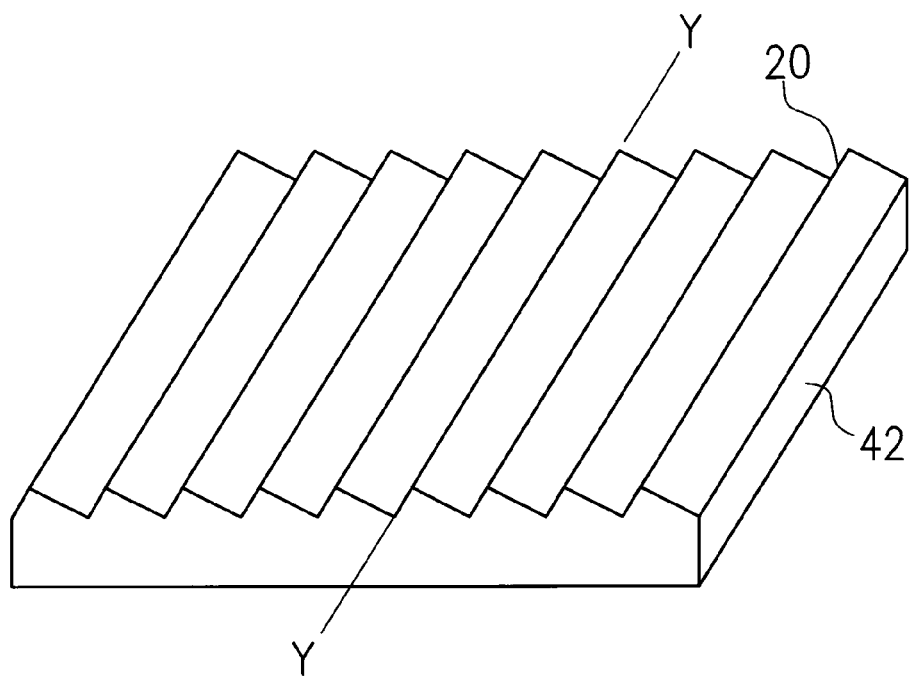
FIG. 5A is an explanatory view showing an arrangement of one prismatic sheet used in one embodiment of the two-sided-emission-type back light unit according to the present invention.
Figure 5B:
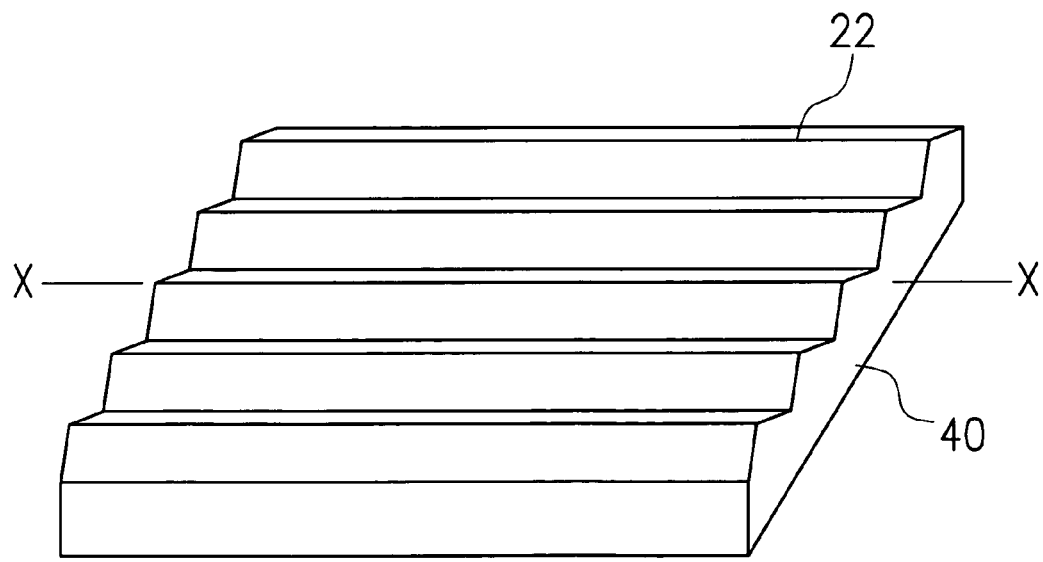
FIG. 5B is an explanatory view showing an arrangement of another prismatic sheet used in the one embodiment of the two-sided-emission-type back light unit according to the present invention.

Each of the prismatic sheets 32 and 34 includes a plurality of prisms having ridge lines. Each ridge line of the prismatic sheet 32 may be disposed to be perpendicular to each of the ridge lines of the prismatic sheet 34 in the X and Y directions, similarly to the prismatic sheets 40 and 42 as shown in FIGS. 5A and 5B.

In this embodiment, the prismatic sheets 32 and 34 are disposed in a laminated state and mounted on a stepped portion 31 provided on a peripheral wall of the hole 72. The stepped portion 31 may be disposed near an inner surface or outer surface of the bottom wall 30a. In this way, because the prismatic sheets 32 and 34 can be located in the hole 72, a thinned two-sided-emission-type back light unit is accomplished without any increment in overall thickness. Moreover, it is possible to place the second LCD 36 in the hole 72 of the holder 30 by providing a stepped portion for mounting the second LCD in the vicinity of the outer surface of the bottom wall of the holder 30.

It should be noted that a surface with a high optical reflectance is formed on at least an inner surface of the holder excluding the hole in which the prismatic sheets 32 and 34 are inserted, or a surface of the holder facing the second emission surface of the back light unit. Light passing the semi-transmissive/reflective layer 46 is reflected on the inner surface of the holder 30 excluding the hole 72, and returned again to the light guiding plate 12 through the semi-transmissive/reflective layer 46.

Formation of a surface with a high optical reflectance or low optical reflectance to fit a particular purpose can be achieved by suitably selecting a material of the holder 30.

Meanwhile, a side of the holder 30 adjacent to the first LCD 44 is entirely open. As shown in FIG. 6A, an open portion 70 of the holder is disposed to expose an exit surface of the second prismatic sheet 42. In addition, the first LCD 44 has a back surface disposed to face the exit surface of the second prismatic sheet 42. A peripheral edge portion of the back surface is fixed on an upper surface portion of the peripheral wall 30b of the holder 30 surrounding the second prismatic sheet 42 by way of a two-sided adhesive tape 33 or the like.

Furthermore, in this embodiment, a flexible printed circuit board 35 to supply power from the peripheral wall 30b of the holder 30 to the light source 14 is positioned in the holder. In this case, the flexible printed circuit board 35 is disposed in the holder 30, and a lead frame connected to the circuit board may be disposed to project from the holder 30.

Meanwhile, the flexible printed circuit board 35 and the semi-transmissive/reflective sheet 16 are disposed in such a way that a bottom surface of the flexible printed circuit board 35 is flush with a bottom surface which is the exit surface of the semi-transmissive/reflective sheet 16, thus making it easy to mount the back light unit on a mother board.

Of the light emitted from the light source 14, the light ray 50 is transmitted within the light guiding plate 12 by repeated reflection and emitted from the second emission surface 12c of the light guiding plate 12. The light emitted from the second emission surface 12c of the light guiding plate 12 is divided into reflected light 52 and transmitted light 54 in the semi-transmissive/reflective layer 46. The reflected light 52 is returned to the light guiding plate 12, and an optical path of the reflected light is corrected to a direction perpendicular to the back surface of the first LCD 44 by the prismatic sheets 40 and 42 to illuminate the back surface of the first LCD 44.

The transmitted light 54 is corrected to a direction perpendicular to the second LCD 36 by the prismatic sheets 32 and 34 associated with the second LCD 36 to act as a back illumination light for illuminating the back surface of the second LCD 36.

The back light unit includes a brightness adjusting section to adjust the brightness of the front illumination light and the back illumination light. The brightness adjusting section is formed by, for example, changing a thickness of the chromatic correcting member 18. In the illustrated embodiment, the brightness adjusting section is effected by varying a thickness of the white-type material constituting the chromatic correcting member 18.

Figure 2:
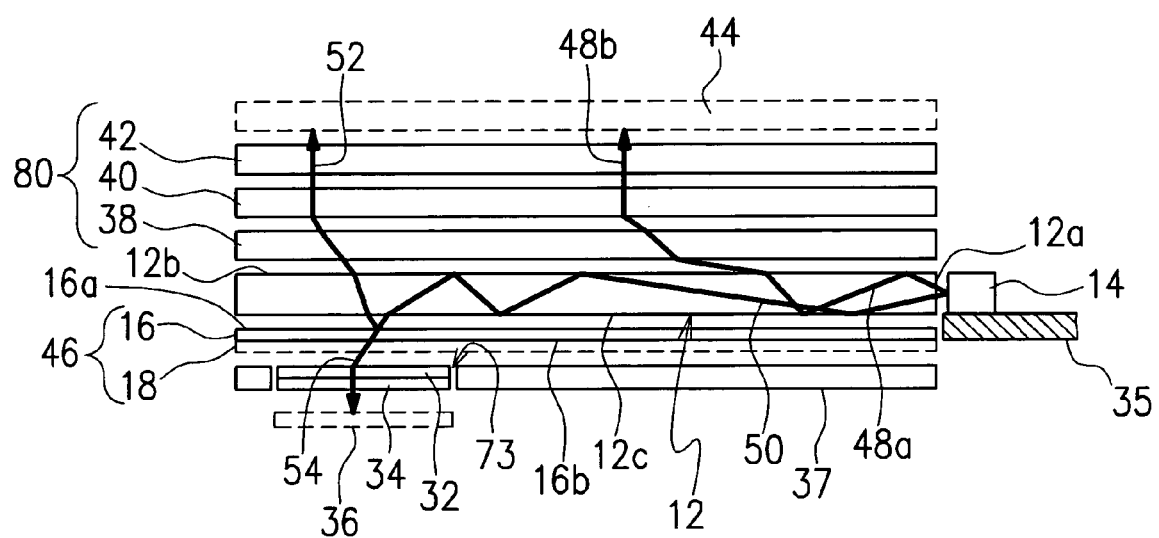
FIG. 2 is a sectional view similar to FIG. 1 showing another embodiment of the two-sided-emission-type back light unit according to the present invention.

FIG. 2 illuminates a second embodiment of the back light unit according to the present invention.

In this embodiment, instead of the holder as mentioned in the previous embodiment, a sheet member 37 such as a white sheet with reflective action or black sheet with absorptive action of light is disposed to face the exit surface 16b of the semi-transmissive/reflective sheet 16. Provided in the sheet member 37 is a hole 73 which is disposed at a position corresponding to the second LCD 36 and in which the prismatic sheets 32 and 34 are disposed.

In other respects the structure of the back light unit is the same as in the previous embodiment, so that identical reference numbers are attached to similar parts, and a detailed description is omitted.

Figure 3A:
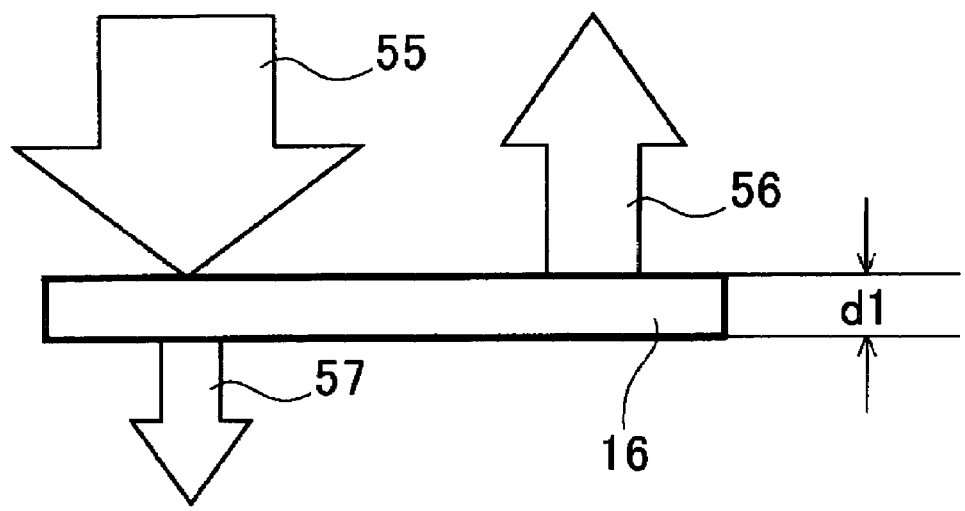
FIG. 3A is an explanatory view of optical transmittance and optical reflectance of a semi-transmissive/reflective sheet.
Figure 3B:
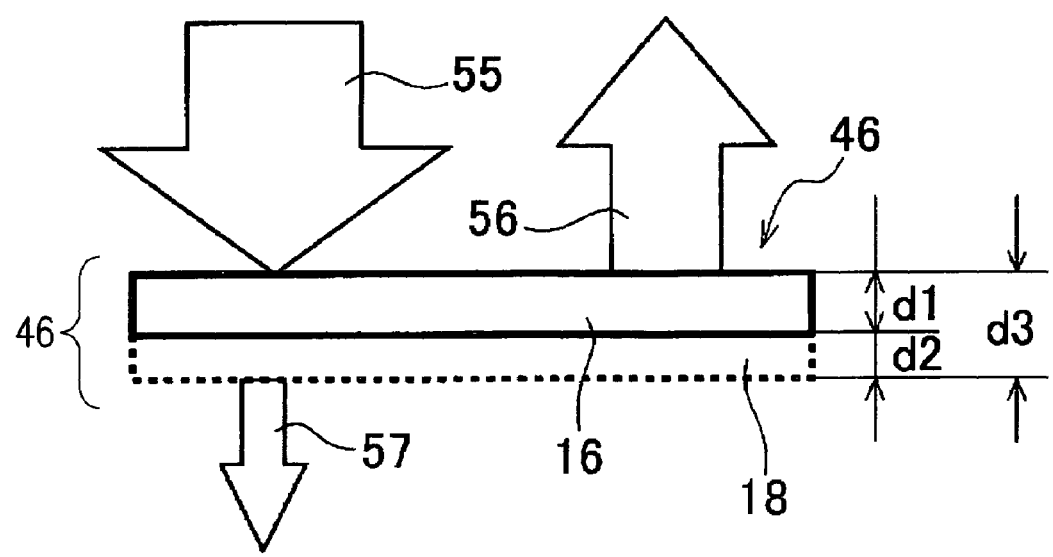
FIG. 3B is an explanatory view of optical transmittance and optical reflectance of a combination of the semi-transmissive/reflective sheet and a white-type material.

Next, operation of the semi-transmissive/reflective layer 46 is explained referring to FIGS. 3A and 3B.

FIG. 3 illustrates the semi-transmissive/reflective layer 46 which is composed of the semi-transmissive/reflective sheet 16 and the white-type material 18 coated on the semi-transmissive/reflective sheet 16, or optical reflectance and optical transmittance of the chromatic correcting member.

Here, FIG. 3A illustrates a case in which the semi-transmissive/reflective layer is constituted by the semi-transmissive/reflective sheet 16 only, whilst FIG. 3B shows a case in which the semi-transmissive/reflective layer 46 is structured such that the white-type material 18 is coated on the semi-transmissive/reflective sheet 16.

In FIG. 3A, the semi-transmissive/reflective sheet 16 has a thickness d1, and, for example, 70 percent of incident light 55 entering the semi-transmissive/reflective sheet 16 is reflected to generate reflected light 56 if light absorption by the semi-transmissive/reflective sheet 16 is neglected, whilst the remaining 30 percent passes through as transmitted light 57.

On the other hand, in FIG. 3B, the semi-transmissive/reflective sheet 16 of thickness d1 is coated by the white-type material 18 of thickness d2 to form the semi-transmissive/reflective layer 46 of thickness d3.

Because light is reflected or transmitted even in the white-type material 18, 80 percent of the incident light 55 is, for example, reflected as the reflected light 56 whilst the remaining 20 percent passes through as the transmitted light 57. That is to say, the ratio of reflected light is increased by the coated white-type material 18. This shows that the optical transmittance and the optical reflectance of the semi-transmissive/reflective layer 46 can be set by way of the white-type material 18.

Figure 4:
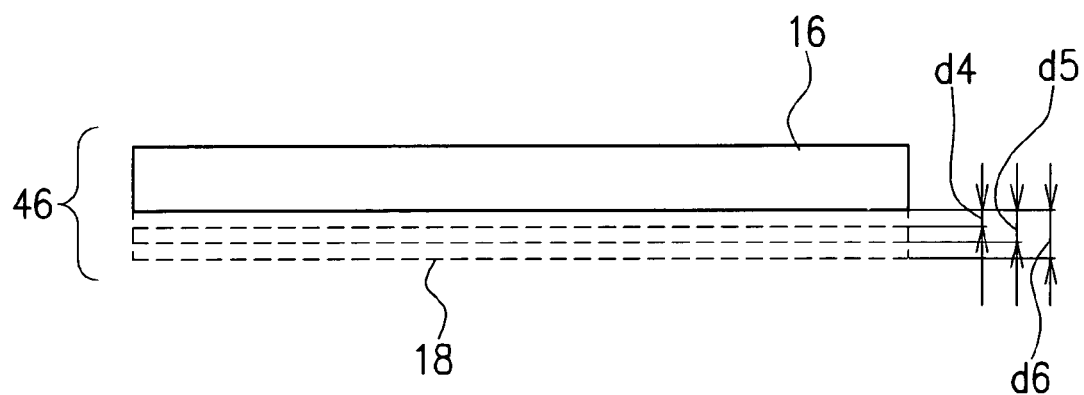
FIG. 4 is an explanatory view of a semi-transmissive/reflective layer in the case that a thickness of the white-type material is changed.

Next, the semi-transmissive/reflective layer 46 used for the back light unit according to the present invention is explained in more detail referring to FIG. 4.

FIG. 4 illustrates the semi-transmissive/reflective layer 46 used for the back light unit according to the present invention.

In the semi-transmissive/reflective layer 46, the semi-transmissive/reflective sheet 16, is coated with the white-type material 18, as mentioned above. When coating, three steps of thicknesses d4, d5 and d6 can be optionally set for the white-type material 18, as shown in FIG. 4, and hence a large capital investment is not required to accomplish the desired thickness of white-type material.

In addition, because the white-type material functions to reflect or transmit light as explained in FIG. 3B, the optical transmittance and the optical reflectance of the semi-transmissive/reflective layer 46 is changed according to the thickness of the coated white-type material 18. In other words, the optical reflectance is increased, while the optical transmittance is decreased as the coating of the white-type material is thickened stepwise from d4 to d5 to d6. That is to say, the brightness of the illumination light for the first LCD 44 becomes greater as the coating thickness increases, and the brightness of the illumination light for the second LCD 36 becomes greater as the coating thickness decreases.

Accordingly, by changing the coating thickness of the white-type material 18, it is possible to adjust the balance of brightness between the first illumination light for illuminating the first LCD 44 located on the front of the back light unit and the second illumination light for illuminating the second LCD 36 located on the back of the back light unit to a desired ratio.

Available methods for coating the white-type material 18 include printing, the knife coat method, the roll coat method, the die coat method, the doctor blade method, the flow coat method and the like, and any of these methods may be selected.

Light which passes through the semi-transmissive/reflective sheet 16 tends to have its color changed from perfect white. In the greater number of cases, the color of the light is shifted in a yellow direction due to the characteristic of the material constituting the semi-transmissive/reflective sheet 16. Consequently, there is a difference in chromaticity between the first illumination light to illuminate the first LCD 44 and the second illumination light to illuminate the second LCD 36, thereby the colors on the two displays appear different from each other.

Therefore, a white-type material 18 is preferably selected to have a spectroscopic characteristic which will correct to the required chromaticity. In the greater number of cases, a white-type material having a strong spectroscopic characteristic in a blue direction is selected to correct the chromaticity of light shifted in the yellow direction.

Titanium CR97 (made by Ishihara Titanium Industrial Co,. Ltd) which is titanic oxide or the like may, for example, be used as a white pigment; also, titania, alumina, magnesia, silica, zirconia, barium sulfate, glass, aluminum nitride, boron nitride or the like may be used as white inorganic particles.

Also, to enhance the spectroscopic characteristic in the blue direction, a blue pigment preparation method in which Fastogen Blue RS (Dainippon Ink Chemical Industrial Co,. Ltd), Cyanin Blue 5240KB (Dainichi Seika Industrial Co,. Ltd), Dyepyroxide Color Blue 9453 (Dainichi Seika Industrial Co,. Ltd), Fastogen Blue 5485 (Dainippon Ink Chemical Industrial Co,. Ltd), or the like is added to a small amount of white pigments or particles, may, for example, be used.

It is required that the above-mentioned pigments be mixed in a binder resin. Various types of resin such as thermoplastic resin, thermo-setting resin or the like can be used for the binder resin. For example, it is possible to use ordinary binder resins for painting, such as acrylic resin, alkyd resin, polyester resin, silicone modified polyester resin, silicone modified acrylic resin, epoxy resin, polycarbonate resin, silicate resin, fluorine resin, chlorine-based resin or the like, as well as epoxy resin, polyvinyl chloride, polyurethane or the like.

In addition, organic solvents such as toluene, ethyl acetate, methyl ethyl ketone or the like or a mixture thereof may as a solvent.

Furthermore, it is possible to disperse transparent beads such as, for example, acrylic beads as a way of enhancing the optical reflectance of the white-type material 18.

According to the present invention, because provision is made of the semi-transmissive/reflective sheet 16 and the chromatic correcting member 18 coated on the semi-transmissive/reflective sheet, as mentioned above, it is possible to correct the chromaticity of the first illumination light and the second illumination light. Also, due to provision of the brightness adjusting section in which adjustment is made in the thickness of the white-type material, it is possible to constantly maintain uniform brightness and uniform chromaticity of the first illumination light and the second illumination light.

Although the preferred embodiments of the present invention have been mentioned, the present invention is not limited to these embodiments, and various modifications and changes can be applied to the embodiments.

What is claimed is:

1. A back light unit, comprising:

a light source;

a light guiding plate having an entrance surface that faces the light source to receive light emitted from the light source, a first emission surface and a second emission surface;

a semi-transmissive/reflective member having an incident surface that faces at least one of the first emission surface and the second emission surface of the light guiding plate and an exit surface; and a chromatic correcting member disposed to face the exit surface of the semi-transmissive/reflective member, the chromatic correcting member including a white-type material that has a spectroscopic characteristic in a direction of blue.

2. The back light unit according to claim 1, wherein the chromatic correcting member is disposed to be in contact with the exit surface of the semi-transmissive/reflective member.

3. The back light unit according to claim 1, wherein the chromatic correcting member is disposed at an interval from the exit surface of the semi-transmission/reflective member.

4. The back light unit according to claim 2, wherein the semi-transmissive/reflective member comprises a semi-transmissive/reflective sheet, wherein the chromatic correcting member is disposed on the exit surface of the semi-transmissive/refletive sheet.

5. The back light unit according to claim 4, wherein the chromatic correcting member including the white-type material is provided on the semi-transmissive/reflective sheet by coating.

6. The back light unit according to claim 1, further comprising a first light focusing member disposed to face the other of the first emission surface and the second emission surface of the light guiding plate and a second light focusing member disposed to face the chromatic correcting member.

7. The back light unit according to claim 1, wherein the brightness of light from the light source is configured by changing a thickness of the chromatic correcting member.

8. A display comprising:

the back light unit as recited in claim 1; and at least one liquid display panel disposed to face the back light unit.

9. The back light unit according to claim 1, wherein the white-type material contains a blue pigment to obtain a spectroscopic characteristic in the direction of blue.

* * * * *